(12) United States Patent
Blanchard

(10) Patent No.: US 7,226,136 B2
(45) Date of Patent: Jun. 5, 2007

(54) SNOWMOBILE SLIDE

(75) Inventor: Leo Blanchard, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 311 days.

(21) Appl. No.: 10/898,955

(22) Filed: Jul. 27, 2004

(65) Prior Publication Data
US 2005/0023060 A1 Feb. 3, 2005

Related U.S. Application Data

(60) Provisional application No. 60/490,904, filed on Jul. 30, 2003.

(51) Int. Cl.
B62D 55/10 (2006.01)
(52) U.S. Cl. .................. 305/127; 384/908; 280/28
(58) Field of Classification Search .............. 280/28; 305/127, 120, 181, 168, 124; 184/100, 5; 474/91, 92; 384/908, 42
See application file for complete search history.

(56) References Cited

U.S. PATENT DOCUMENTS 3,545,821 A * 12/1970 Erickson .................. 305/127
3,613,811 A * 10/1971 Brandli et al. ............. 180/193
3,770,330 A * 11/1973 Bombardier ............... 305/127
3,820,858 A * 6/1974 Reeve ....................... 305/117
3,887,242 A * 6/1975 Russ, Sr. ................... 305/128
4,036,320 A * 7/1977 Rabehl ....................... 180/9.1
5,364,682 A * 11/1994 Tanaka et al. .............. 428/138
5,571,275 A * 11/1996 Cyr ........................... 305/127
5,904,217 A * 5/1999 Yamamoto et al. ........ 180/193
6,155,656 A * 12/2000 Gulla ........................ 305/127
2002/0017765 A1* 2/2002 Mallette et al. .............. 280/28

* cited by examiner

Primary Examiner—J. Allen Shriver
(74) Attorney, Agent, or Firm—Osler, Hoskin & Harcourt LLP

(57) ABSTRACT

A slide rail assembly adapted for engaging a drive track of a snowmobile. The slide rail assembly comprises a rail adapted for engagement with a rear suspension system of the snowmobile, and aligned forward and rear slide portions disposed on a lower surface of the rail adjacent the drive track. The forward and rear slide portions are respectively located on forward and rear portions of the rail. The rear slide portion comprises a first material and the forward slide portion comprises a second material, the second material having a hardness which is less than that of the first material. Noise and vibrations resulting from contact between the drive track and the forward slide portion are attenuated by the second material.

13 Claims, 4 Drawing Sheets

SNOWMOBILE SLIDE

This application claims the benefit of priority to U.S. Provisional Application 60/490,904 filed on Jul. 30, 2003, the contents of which are incorporated herein by reference.

TECHNICAL FIELD

The present invention relates generally to slide rails of a snowmobile, and relates more particularly to a snowmobile slide rail which reduces noise and vibrations typically caused by contact between the slide rails and the drive track.

BACKGROUND OF THE INVENTION

Snowmobile suspension systems generally include a pair of aluminum slide rails, which support the endless drive track and provide a structure to which the lower ends of the hydraulic shock absorbers are attached. The bottom surface of the slide rail which is in sliding contact with the track is covered with a hard plastic slide strip, generally made of Ultra High Molecular Weight Polyethylene (UHMWPE), to reduce the friction between the drive track and the slide rails. These aluminum slide rails also act as a guide which keeps the endless track in-line such that the drive sprockets are continuously in-line with driving holes in the track.

Steel clips are typically located on the inside surface of the endless track between each consecutive driving hole, each clip having a flat portion which slides under the slide rail and an upwardly extending portion which aligns with the inner edge of the slide rail. These steel clips therefore keep the drive track aligned with the slide rails, preventing excessive lateral movement of the drive track while it longitudinally slides over the UHMWPE slide strip of the slide rails.

However, although the drive track remains in contact with the slide rails along much of the length thereof, there is typically a gap between the drive track and the slide rails near the forward upwardly curved portions of the slide rails, between the front drive axle and the forward end of the slide rails. This front portion of the drive track is accordingly unsupported by the slide rails. During operation of the snowmobile, especially over uneven terrain, this unsupported front portion of the track tends to buckle inwardly and outwardly due to the changing tension in the track or the result of uneven terrain. This rapid buckling of the track can result in contact between the steel clips on the track and front edges of the slide rails. This contact makes an undesirable noise and causes vibrations which are transferred to the driver and passengers of the snowmobile.

Some attempts have been made to address this problem. Particularly, the number of steel clips on the inside of the drive track have been reduced, by locating such clips only between every second or third hole for example, in an attempt to reduce the amount of noise created by their contact with the UHMWPE slide strips of the slide rails. However, proper alignment of the drive track cannot be maintained if too many steel guide clips are removed from the track.

Therefore, there remains a need to reduce the noise and vibrations cause by the contact between the drive track and the slide rails of a snowmobile, without negatively affecting the alignment of the drive track on the slide rails.

SUMMARY OF THE INVENTION

It is an object of the present invention to provide slide rails for a snowmobile which reduce noise and vibrations caused by contact with the drive track.

It is another object of the present invention to provide a snowmobile having slide rails which reduce noise and vibrations caused by contact with the drive track.

Therefore, in accordance with the present invention, there is provided a slide rail assembly adapted for engaging a drive track of a snowmobile, the slide rail assembly comprising: a rail adapted for engagement with a rear suspension system of the snowmobile, the rail having an elongated rear portion adapted for being aligned parallel to the drive track and an upturned forward portion; aligned forward and rear slide portions disposed on a lower surface of the rail adjacent the drive track and respectively located on the forward portion and the rear portion of the rail, the rear slide portion being capable of load-bearing and of sliding contact with the drive track; and the rear slide portion comprising a first material and the forward slide portion comprising a second material, the second material having a hardness which is less than that of the first material; whereby noise and vibrations resulting from contact between the drive track and the forward slide portion are attenuated by the second material.

There is also provided, in accordance with the present invention, a snowmobile comprising: a chassis including a tunnel; an engine disposed on the chassis at a forward end thereof and a seat disposed on the tunnel behind the engine; two skis linked to the chassis by a front suspension system; a steering device disposed on the chassis forward of the seat and being operatively connected to the skis for steering the snowmobile; a drive track disposed below the tunnel and being operatively connected to the engine for propulsion of the snowmobile, the drive track being guided and supported by at least two slide rail assemblies linked to the chassis by a rear suspension system; the slide rail assemblies each comprising a rail having an elongated rear portion aligned substantially parallel to the drive track and an upturned forward portion; aligned forward and rear slide portions being disposed on a lower surface of the rail adjacent the drive track and respectively located on the forward portion and the rear portion of the rail, the rear slide portion having a first material and the forward slide portion having a second material; and the second material having a hardness which is less than that of the first material; whereby noise and vibrations resulting from contact between the drive track and the forward slide portion are attenuated-by the second material.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
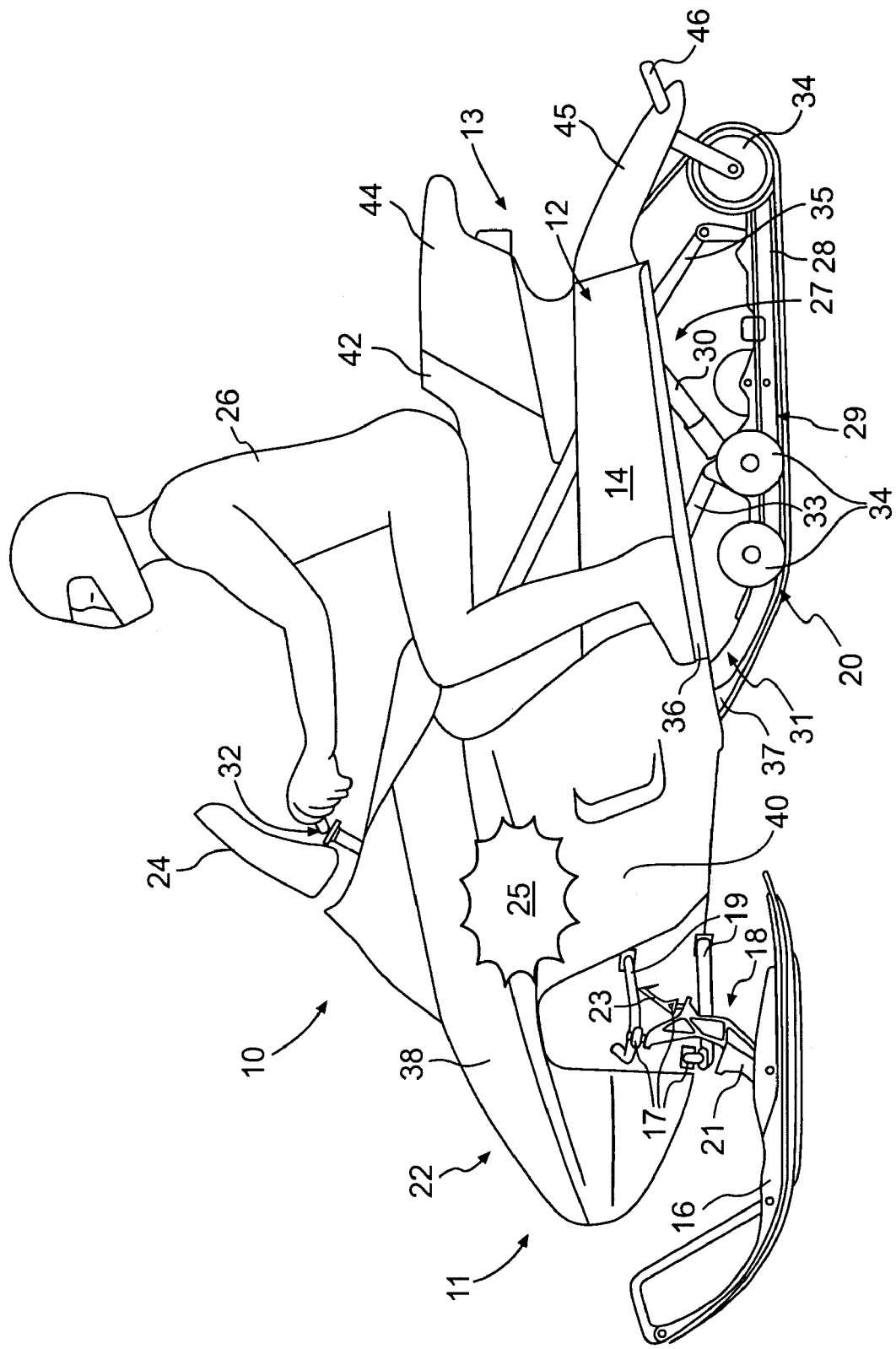
FIG. 1 is a perspective of a snowmobile.

FIG. 1 shows a typical snowmobile 10 having a forward end 11 and a rearward end 13, defined consistently with a travel direction of the vehicle. The snowmobile 10 includes a chassis 12 which normally includes a rear tunnel portion 14, a front engine cradle portion (not shown), and a front suspension assembly portion (not shown). While hidden behind the fairings 22 in FIG. 1, an engine 25, which provides motive force for the vehicle, is supported by the engine cradle portion of the chassis 12. In addition, two front skis 16 are attached to the forward end of the chassis 12 through a front suspension system 18. The front suspension system 18 generally comprises a double A-arm type suspension, having two A-arms 19 on either side of the vehicle, which link a ski leg 21 with the chassis 12. The ski legs 21 are attached the skis 16 at a lower end and to the upper and lower A-arms 19 at an upper end thereof. The ski leg 21 preferably includes three ball joints 17 at the attachment points with the upper and lower A-arms 19 and with the steering rod 23. The steering rod 23 rotates the ski leg 21 about an axis defined between the ball joints between the ski leg 21 and the A-arms 19, to rotate the skis 16. The steering rods 23 are linked to a steering device 32, such as a handlebar, which is positioned forward of a rider for providing directional control of the snowmobile 10. Thus, by turning the steering device 32, the ski legs 21 are pivoted, thereby turning the skis 16 to steer the vehicle in a desired direction.

At the front of the, chassis 12, the snowmobile 10 comprises an external shell including fairings 22 that enclose the engine 25 to protect it, and which can be decorated to render the snowmobile 10 more aesthetically pleasing. Typically, the fairings 22 comprise a hood 38 and one or more side panels 40. In the particular snowmobile 10 depicted, the side panels 40 open away from the snowmobile along a vertical axis, independently from the hood 38, which pivots forward about a horizontally extending axis. A windshield 24, which may be connected either to the fairings 22 near the forward end 11 of the snowmobile 10 or directly to the handlebars 32, acts as wind deflector to lessen the force of the air on the rider 26 when the snowmobile is moving.

A seat 42 is provided at the rearward end 13 of snowmobile 10 behind the engine 25. A rear portion 44 of the seat 42 may include a storage compartment or can be used to provide a passenger seat. Additionally, a rear grab handle/bumper 46 extends from a rear fairing 45. Two footrests 36 are also positioned on either side of seat 42 to accommodate the rider's feet.

A drive track 20 is disposed under tunnel 14 of the chassis 12 and is operatively connected to the engine 25 for propulsion of the snowmobile 10. A rear suspension system 27 comprises two parallel aluminum slide rails 28, which generally position and guide the endless drive track 20 and which have idler wheels 34 engaged thereto. The rear suspension system 27 further includes at least one shock absorber 30, and comprises forward and rear suspension arms 33 and 35 which attach the slide rails 28 to the chassis 12.

The aluminum slide rails 28 keep the drive track 20 in-line such that the teeth of the drive sprockets are maintained aligned with the corresponding drive holes in the track 20. The slide rails 28 support the drive track 20 and provide a structure to which the lower ends of the hydraulic shock absorbers 30 are attached. Adjacent the forward upturned ends 31 of the slide rails 28, a gap 37 is defined between the drive track 20 and the guide rails 28. This gap 37 results in an unsupported forward portion of the drive track 20 which is not normally in contact with the slide rails 28. However, during operation of the snowmobile 10, especially over rough terrain, this unsupported portion of the drive track 20 tends to periodically come into contact with the guide rails 28 causing unwanted noise and vibrations.

Figure 2:
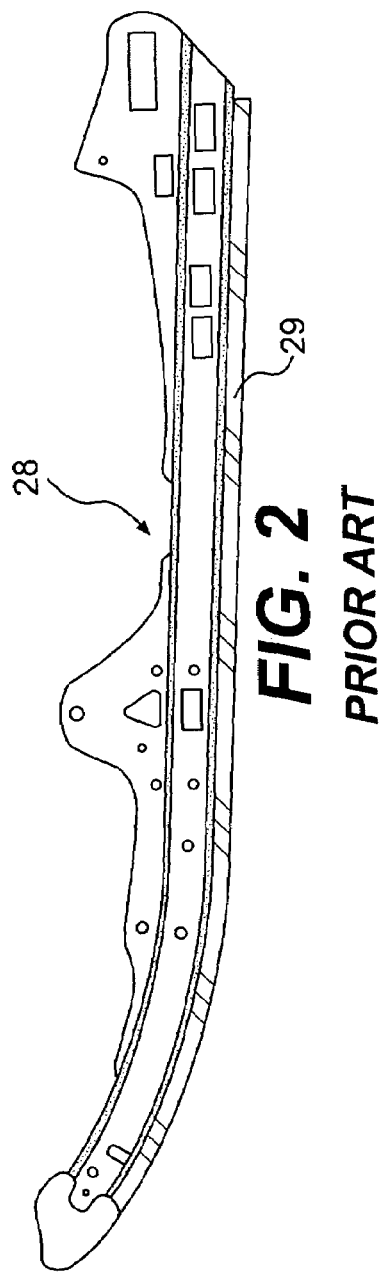
FIG. 2 is a side elevation view of a snowmobile slide rail of the prior art.
Figure 3:
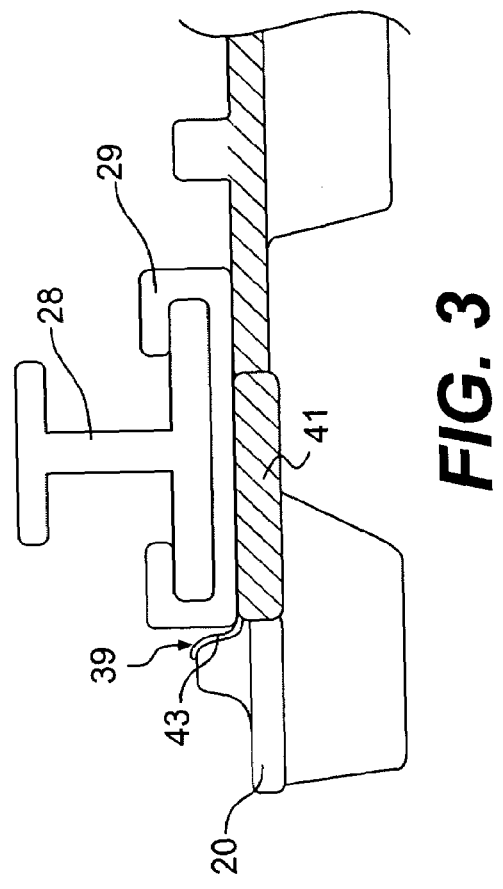
FIG. 3 is a partial cross-sectional view of a snowmobile slide rail of the prior art and a drive track engaged therewith.

Referring to prior art FIGS. 2 and 3, the bottom surface of the conventional aluminum slide rail 28 includes a plastic slide 29 to reduce contact friction between the slide rails 28 and the drive track 20. The slides 29 are commonly made of a very hard and durable material such as Ultra-High Molecular Weight Polyethylene (UHMWPE ASTM D-4020-81). Attached to the endless drive track 20, between each consecutive drive hole therein, are steel clips 39 which cover the portion of the track between each consecutive hole. Each steel clip 39 has a flat portion 41 which slides under the slide 29 and an upwardly extending portion 43 which is in-line with an edge of the slide rail 28 to prevent the drive track 20 from lateral displacement while sliding over the length of the slides 29. It is the contact between these steel clips 39 at the forward unsupported portion of the drive track 20, which tends to buckle inwardly and outwardly during operation of the snowmobile due to varying tension in the track, and the hard UHMWPE slides 29 which causes unwanted noise and vibrations.

Figure 4:
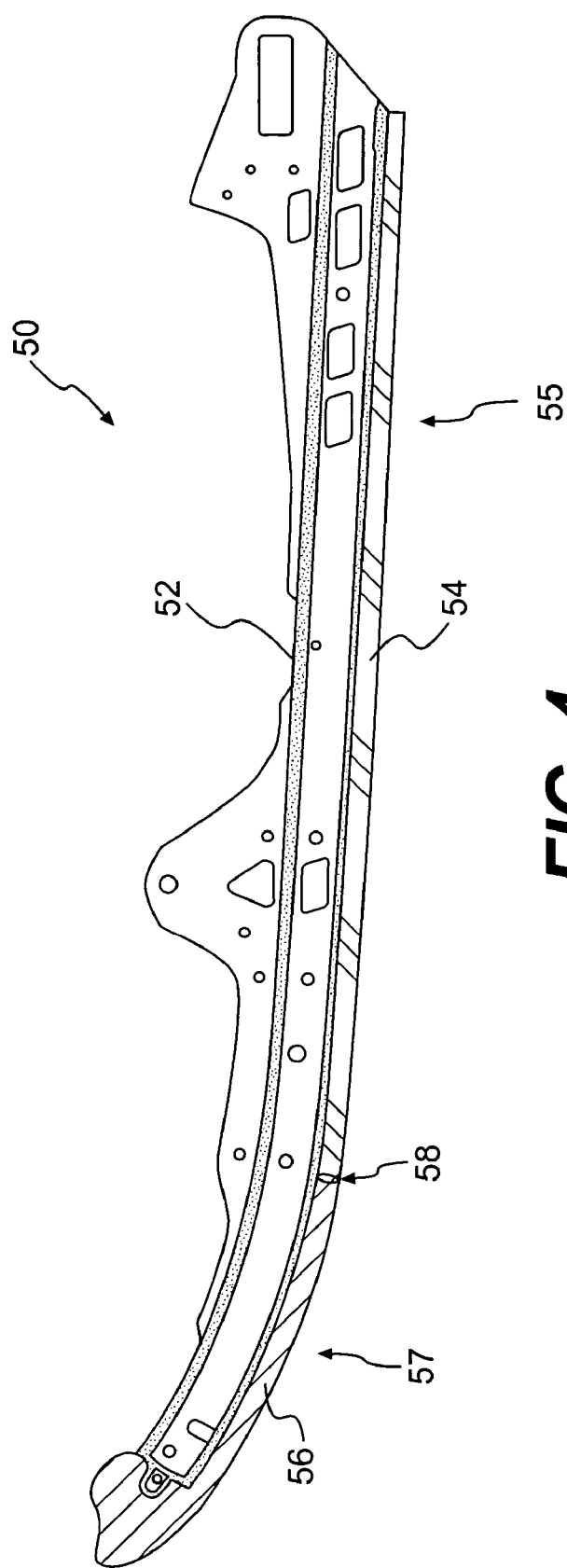
FIG. 4 is a side elevation view of a snowmobile slide rail in accordance with a first embodiment of the present invention.
Figure 5:
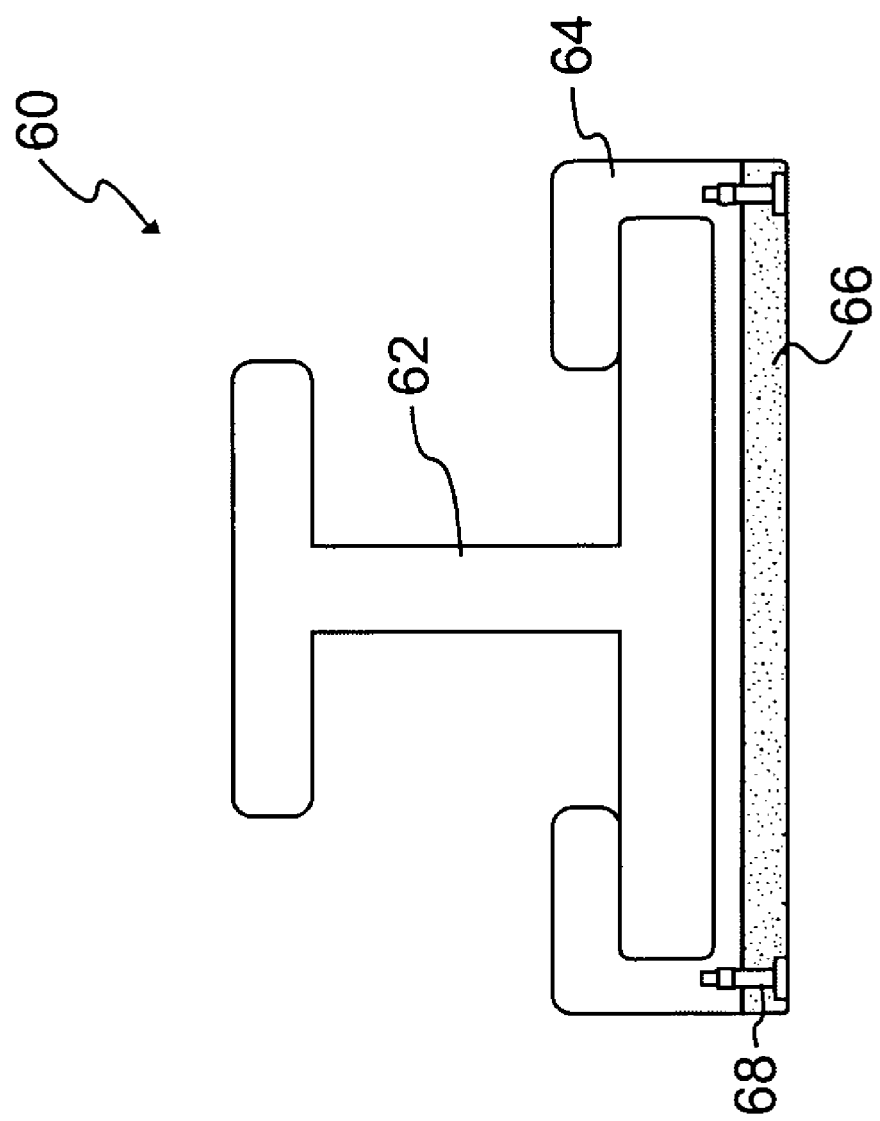
FIG. 5 is cross-sectional view of a snowmobile slide rail in accordance with a second embodiment of the present invention.

Referring now to the present invention as depicted in FIGS. 4 and 5, a simple and cost effective solution is provided to reduce noise and vibrations cause by the periodic contact between the steel clips 39 of the forward unsupported portion of the drive track 20 and the UHMWPE slides 29 of the slide rails 28 during operation of the snowmobile. Generally, a slide element made of a softer material, such as rubber, is disposed on the forward portion of the slide rails, either instead of or overtop of the much harder UHMWPE slide 29. As the forward portion of the slide rails do not directly support the weight of the vehicle and are not in permanent sliding contact with the metal clips of the drive track, a much softer material can be used thereon. Such a soft forward slide covering will accordingly absorb more energy from the percussive contact between the unsupported portion of the drive track and the slide rails, thereby reducing noise and vibrations resulting therefrom.

Referring to a first embodiment of the present invention depicted in FIG. 4, a slide rail assembly 50 comprises an aluminum slide rail 52 and a slide strip 59. Slide strip 59 has a hard slide strip 54 under a rear, substantially rectilinear portion 55 of the rail. A softer slide strip 56 is disposed under a forward, upwardly curved portion 57 of the slide rail 52. The hard slide strip 54 is preferably made of UHWMPE. The softer slide strip 56 is made of a relatively softer material, such as rubber or a rubber compound or a softer UHWMPE than that portion of the slide strip under the rear, substantially rectilinear portion 55 of the rail 52. The hard UHWMPE slide strip 54 generally has a hardness in the range of 62–66 Shore D. The softer rubber slide 56 accordingly has a Shore D hardness value of less than 62, and preferably about 60. The softer slide strip 56 accordingly absorbs more vibration and noise than the hard slide strip 54, by virtue of its softer material. Particularly, the softer slide strip 56 permits slight elastic deformation when struck by the drive track 20, thereby absorbing much of the vibrations and noise which would have otherwise resulted from contact between the drive track 20 and a harder slide material. A material which is even softer than a rubber having a Shore D hardness value of less than 60 can be used for the softer slide strip 56 to further absorb even more noise and vibration. However, it is understood that the softer the material, the less friction it can withstand before wearing out. Accordingly, a softer material may absorb more noise and vibrations, but would have to be replaced more frequently. It is contemplated that at least the softer slide strip 56 be removably engaged to the aluminum slide rail 52, such that it can be selectively replaced if it wears out before the harder rear portion of the slide strip. Accordingly, the soft slide strip 56 is engaged to the slide rail 52 by a removable fastening means such as a removable adhesive, individual threaded fasteners, and the like. Any fastening means can be used which will retain the soft slide strip 56 in place, but which permits it to be removed and replaced when necessary.

Another method of constructing the slide strip 59 according to the present invention is to have the slide strip moulded as a single piece made from the two different materials. Accordingly, the front portion of the slide strip 59 will be made of a softer material than the rear portion of the slide strip 59 as described above. The front and rear sections would have a continuous cross-section in order to mate with the corresponding cross section of the slide rail as shown in FIGS. 3 and 5. Since conventional UHMWPE slide strips 29 are removable from the slide rails 52 by simply sliding the slide strips 29 onto the slide rails 52, as is depicted in FIGS. 3 and 5, in order to be replaced once worn, the one-piece slide strip 59 of the present invention, made of two types of material, could also be installed in a similar manner.

The hard UHMWPE rear slide strip 54 is positioned on the slide rail 52 such that it is in continuous sliding contact with the drive track 20. The hard slide strip 54 therefore extends along the underside of the aluminum slide rail 52 a sufficient length to support the entire weight of the snowmobile. The forward softer slide strip 56 is preferably not load bearing, and is not in continuous contact with the drive track 20 when traversing even terrain, as the softer material may not be as effectively withstand the continuous sliding contact with the metal clips 39 of the drive track 20. Accordingly, the transition 58 between the forward softer slide strip 56 and the rear hard slide strip 54 occurs at a point along the slide rail 52 at which the drive track 20 and the slide rails assemblies 50 are no longer in continuous contact. This point is typically disposed near the forward, upwardly curved portion of the slide rails 52, between the front drive axle of the snowmobile and the forward tip of the slide rails 52.

As would be appreciated by one skilled in the art, the slide strips 59 of the present invention would also be advantageous where the forward portion of the slide rail 52, thus the forward portion of the slide strip 59, are also supporting a portion of the weight of the snowmobile. In this case, the drive track 20 and steel clips 39 will still hit against the slide strip 59 due to the flexibility of the oncoming drive track 20 and the fact that the bottom of the slide strip 59 is not always in perfect alignment with the oncoming drive track 20 and steel clips 39 therefore creating unwanted noise and vibrations on contact. Having the front portion of the slide strip 59 made of a softer material will diminish the noise and vibration created during this contact as described above.

Referring now to FIG. 5, the second embodiment of the present invention is depicted. The alternate slide rail assembly 60 comprises an aluminum slide rail 62 under which a hard UHMWPE slide 64 is provided along the full length of the aluminum slide rail 62, as is the case with the prior art slide rail depicted in FIG. 2. The slide rail assembly 60, however, further comprises a softer slide strip portion 66 engaged over the hard slide 64, along the forward upturned end of the slide rail 62. Accordingly, the softer slide strip portion 66 damps the noise and vibrations caused by percussive contact between the unsupported portion of the drive track 20 and the slide rail assemblies 60, much in the same way as the first embodiment of FIG. 4, however the softer slide strip portion 66 is constructed to be able to cover over the original hard UHMWPE slide 64 covering the front portion of the slide rail 62. The base UHMWPE slide 64 can be shaped at the forward end thereof to accept the softer material placed overtop thereof. Alternately, the softer slide strip portion 66 can be configured to be able to fit over standard hard UHMWPE slide rail slides, such that existing snowmobile slide rails can be retrofitted. Therefore, both older and new snowmobiles can be easily configured to reduce unwanted noise and vibrations caused by the contact between the unsupported portion of the drive track 20 and the forward ends of the slide rails. The softer slide strip portion 66 can be engaged over the hard UHMWPE slide 64 using fasteners 68 as depicted in FIG. 5 or another suitable fastening means such as adhesives, etc. The soft lide strip portion 66 is preferably made of rubber or a rubber compound as per the embodiment of FIG. 4 described above. Similarly, the soft slide strip portion 66 is also selectively removable to the rest of the slide rail assembly 60, such that if it becomes worn, it can be removed and replaced.

The embodiments of the invention described above are intended to be exemplary. Those skilled in the art will therefore appreciate that the forgoing description is illustrative only, and that various alternatives and modifications can be devised without departing from the spirit of the present invention. For example, although the hard slide strips are preferably made of UHMWPE and the softer slide strips are preferably made of a softer rubber, any equivalent materials which will perform similar functions can be used. Accordingly, the present is intended to embrace all such alternatives, modifications and variances which fall within the scope of the appended claims.

The invention claimed is:

1. A slide strip suitable for mounting on a snowmobile rear suspension slide rail adapted to engage a snowmobile drive track, the slide strip comprising:
   a rear slide portion comprising a first material; and
   a forward slide portion comprising a second material, the forward slide portion having a hardness which is less than that of the rear slide portion,
   the rear slide portion and the front slide portion being molded into a unitary article having the same cross section throughout.

2. The slide strip as defined in claim 1, wherein the first material is an ultra high molecular weight polyethylene.

3. The slide strip as defined in claim 2, wherein the second material is a rubber.

4. The slide strip as defined in claim 1, wherein the rear slide portion and the forward slide portion are discrete from each other.

5. The slide strip as defined in claim 4, wherein the forward slide portion is replaceable with respect to the rear slide portion.

6. A snowmobile comprising:
   a chassis including a tunnel;
   an engine disposed on the chassis at a forward end thereof and a seat disposed on the tunnel behind the engine;
   two skis linked to the chassis by a front suspension system;

a steering device disposed on the chassis forward of the seat and being operatively connected to the skis for steering the snowmobile;

a drive track disposed below the tunnel and being operatively connected to the engine for propulsion of the snowmobile, the drive track being guided and supported by at least two slide rail assemblies linked to the chassis by a rear suspension system, the slide rail assemblies each comprising a slide rail having an elongated rear portion aligned substantially parallel to the drive track and an upturned forward portion; and a slide strip as defined in claim 1, mounted to each slide rail so as to extend below the elongated rear portion and the upturned front portion of the slide rail between the drive track and the slide rail.

7. A slide strip suitable for mounting on a snowmobile rear suspension slide rail adapted to engage a snowmobile drive track, the slide strip comprising:

a rear slide portion comprising a first material; and a forward slide portion comprising a second material, the forward slide portion having a hardness which is different than that of the rear slide portion, the second material being a rubber.

8. The slide strip as defined in claim 7, wherein the forward slide portion has a hardness which is less than that of the rear slide portion.

9. The slide strip as defined in claim 8, wherein the first material is an ultra high molecular weight polyethylene.

10. The slide strip as defined in claim 8, wherein the rear slide portion and the forward slide portion are discrete from each other.

11. The slide strip as defined in claim 10, wherein the forward slide portion is replaceable with respect to the rear slide portion.

12. The slide strip as defined in claim 8, wherein the rear slide portion and the front slide portion are molded into a unitary slide strip having the same cross section throughout.

13. A snowmobile comprising:

a chassis including a tunnel;

an engine disposed on the chassis at a forward end thereof and a seat disposed on the tunnel behind the engine;

two skis linked to the chassis by a front suspension system;

a steering device disposed on the chassis forward of the seat and being operatively connected to the skis for steering the snowmobile;

a drive track disposed below the tunnel and being operatively connected to the engine for propulsion of the snowmobile, the drive track being guided and supported by at least two slide rail assemblies linked to the chassis by a rear suspension system, the slide rail assemblies each comprising a slide rail having an elongated rear portion aligned substantially parallel to the drive track and an upturned forward portion; and a slide strip as defined in claim 7, mounted to each slide rail so as to extend below the elongated rear portion and the upturned front portion of the slide rail between the drive track and the slide rail.

* * * * *